UNITED STATES PATENT OFFICE.

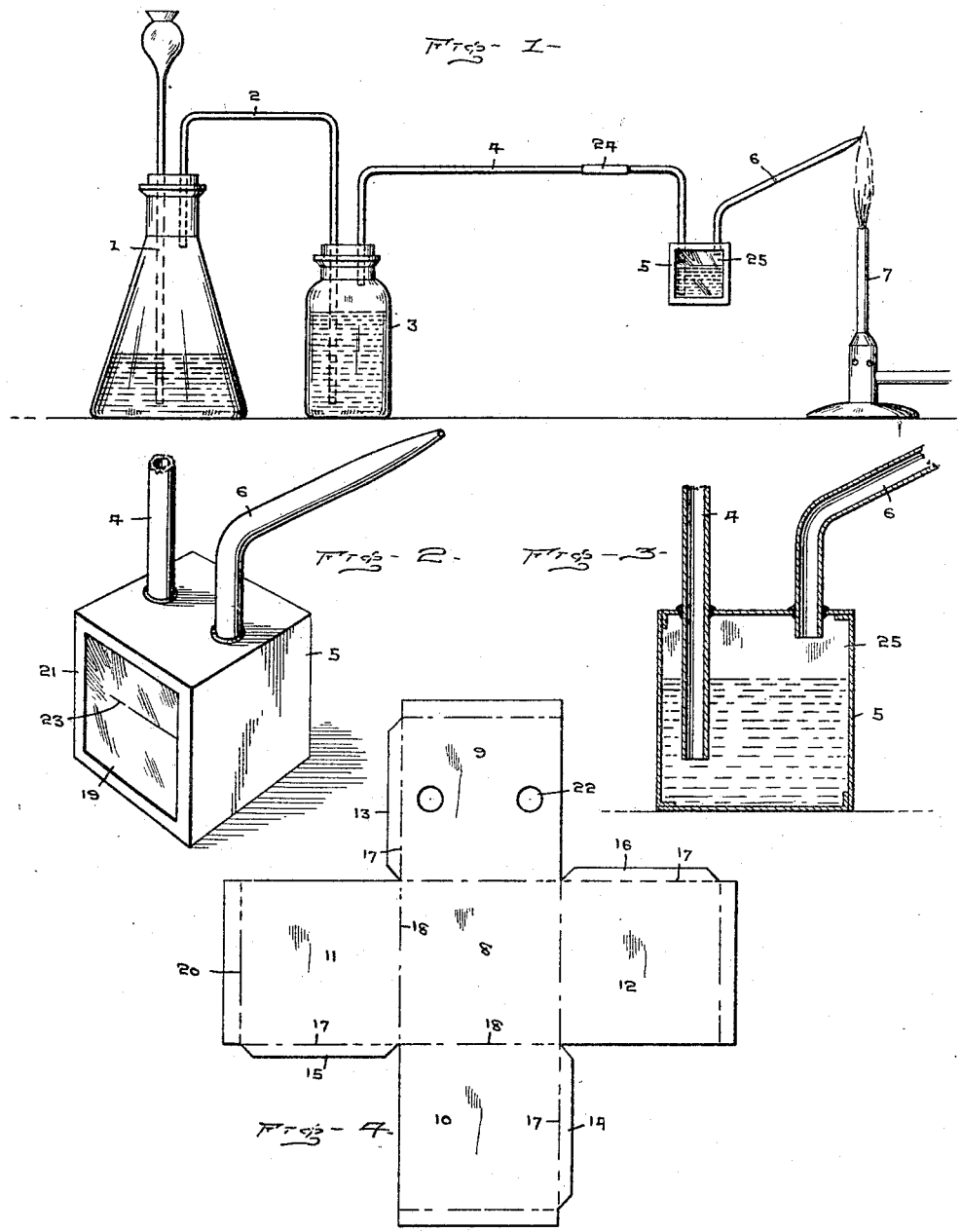

PAUL KEEVER, OF WESTON, WEST VIRGINIA.

GAS-TRAP.

1,210,173.  Specification of Letters Patent.  Patented Dec. 26, 1916.

Application filed April 5, 1916. Serial No. 89,185.

*To all whom it may concern:*

Be it known that I, PAUL KEEVER, a citizen of the United States, residing at Weston, in the county of Lewis and State of West Virginia, have invented certain new and useful Improvements in Gas-Traps; and I do hereby declare the following to be a full, clear, and exact description of the invention, such as will enable others skilled in the art to which it appertains to make and use the same.

My invention relates to new and useful improvements in combined gas traps and destroyers, and my object is to provide means particularly adaptable for destroying hydrogen sulfid fumes and so construct the same that the gases from the generator and precipitating receptacles will be conveyed through the trap and discharged into a flame where it is destroyed.

A further object is to provide a seal of water or other liquid within the trap to prevent the force of the gas, should the same explode, from reaching the precipitating receptacle.

A further object is to provide a receptacle of metal, the walls of which may be blanked out and bent into shape and secured together.

A further object is to provide a transparent side for the trap. And a further object is to provide means for securing the parts of the trap together whereby the same will be nonleakable.

Other objects and advantages will be hereinafter set forth and more particularly pointed out in the accompanying specification.

In the accompanying drawings which are made a part of this application, Figure 1 is an elevation of a hydrogen sulfid generator and precipitating receptacle showing my improved trap attached thereto. Fig. 2 is a detail perspective view of the trap. Fig. 3 is a vertical transverse sectional view through the trap, and Fig. 4 illustrates a blank from which the walls of the trap are constructed.

Referring to the drawings in which similar reference numerals designate corresponding parts throughout the several views, 1 indicates a generating chamber which may be constructed in any preferred manner, preferably in the form of a bottle, into which is introduced substances from which arise poisonous fumes and gases, said fumes being conveyed from the generator 1 through a tube 2 into a precipitating receptacle 3 and from thence through a tube 4 into my improved form of trap 5, said trap having a nozzle 6 attached thereto through which the gases and fumes are discharged from the trap, and in order to destroy said fumes a burner 7, of any preferred structure is positioned below the discharging end of the nozzle so that the flame from the burner will ignite and destroy the gases as they leave the nozzle.

The body of the trap is preferably formed of sheet metal and before being folded together, is in the shape of the blank shown in Fig. 4 of the drawings, wherein the central portion 8 of the blank forms the rear wall of the trap, the section 9 the top wall thereof, the section 10 the bottom wall thereof and the sections 11 and 12 the side walls of the trap, one edge of each of the sections 9, 10, 11 and 12 having an extension 13, 14, 15 and 16 respectively, said extensions being folded along the dotted lines 17 until the extensions are at right angles to their respective sections and so positioned that they pass into engagement with the inner face of the contiguous sections when said sections are folded along the dotted lines 18, thus disposing all of said sections at right angles to each other and forming a substantially square body.

In order to obtain a view of the interior of the trap, the front wall 19 is preferably formed of glass, or similar transparent substance, and in order to secure the glass in position and form a water tight seal, the ends of each of the sections 9, 10, 11 and 12 are bent inwardly at right angles along the dotted lines 20 so that when the sections are secured together, a rectangular frame 21 will be formed at the open side of the trap and the glass 19 is rested against the inner face of the frame and attached thereto in any suitable manner, as by cement or other adhesive substance which will securely hold the glass in position and prevent leakage of water or gas from the trap.

The upper wall of the trap, formed by the section 9, has perforations 22 formed therethrough, through which the tube 4 and nozzle 6 extend, said tube and nozzle being soldered to the top wall, and if preferred, a ribbed punch may be used for forming the openings, leaving jagged edges around said openings which will facilitate the soldering operation.

In operation, the trap 5 is filled with water to a predetermined height, as indicated by a score mark 23 on the glass wall 19, the water being introduced through one section of the tube 4, the sections of said tube being then secured together by a coupling 24 and as the end of the tube entering the trap extends downwardly to a point adjacent the bottom of the trap or a distance below the surface of the water, the gases, etc., will be forced to bubble up through the water into the space 25 at the upper end of the trap from whence it escapes through the nozzle 6.

The prime object of placing the water in the trap is to prevent a back fire from the trap through the tube 4 into the precipitating receptacle 3, as the gases formed in the receptacle 1, are explosive and it sometimes happens that the force of the explosion passes back through the nozzle into the trap, but the force of said explosion is not sufficient to destroy the trap or force the water upwardly through the tube 4.

In forming the trap from the blank, the sections 9, 10, 11 and 12 are folded at right angles to the central section 8 and the extensions then soldered to the sections with which they overlap. The glass is then placed in position and the ends of the sections bent inwardly to form the frame 21, the glass being then secured to the frame by applying an adhesive substance between the glass and frame, or if desired, the glass may be placed over the outer face of the frame and attached thereto in the same manner.

A section of the tube 4 and the nozzle 6 are then introduced through the openings 22 and secured thereto by soldering when the trap is filled with water to the proper height and the sections of the tube then secured together by the coupling 24.

Having thus fully described my invention what I claim as new and desire to secure by Letters Patent of the United States, is:—

1. A gas trap formed from a sheet of metal and bent into cubical formation and the overlapping parts thereof secured together, one face wall of the trap being formed of transparent material, an inlet pipe for the trap, and an outlet nozzle communicating with the upper portion of the trap.

2. A trap for gases, comprising a hollow receptacle, the upper and lower walls and side walls of the receptacle being formed integral with the rear wall, said walls being bent at right angles to the rear wall and having extensions thereon, the extension of one wall being adapted to overlap with the contiguous wall and be secured thereto, the front wall of the receptacle being formed of transparent material, the ends of the top and bottom and side walls being bent inwardly to form a frame to which the transparent wall is secured.

In testimony whereof I have signed my name to this specification in the presence of two subscribing witnesses.

PAUL KEEVER.

Witnesses:
JAMES RALSTON,
W. B. LINGER.

Copies of this patent may be obtained for five cents each, by addressing the "Commissioner of Patents, Washington, D. C."